Patented Dec. 18, 1951

2,578,759

UNITED STATES PATENT OFFICE 2,578,759

PROCESS OF PREPARING POLYCARBOXYLATED NAPHTHALENE DERIVATIVES

James M. Straley and Clyde W. Wayman, Kingsport, Tenn., assignors to Eastman Kodak Company, Rochester, N. Y., a corporation of New Jersey No Drawing. Application January 27, 1950, Serial No. 140,948

9 Claims. (Cl. 260—342)

This invention relates to the improved oxidation of certain bridged naphthalenes. More particularly, this invention relates to the catalytic oxidation of 1,8 and 4,5 bridged naphthalenes to polycarboxylated naphthalenes.

As far as we are aware in the prior art, there has not been very much research work carried out on the oxidation of the aforementioned type of compound. In those few instances where the naphthalene type of compound referred to above has been investigated, the prior art processes have involved the use of relatively expensive oxidizing reagents such as dichromate, permanganate, and the like. There have been carried out in the prior art oxidation processes applied to hydrocarbon compounds exemplified by toluene, ethyl benzene and the like, or pentane, butane and the like. However, in general, these processes have utilized temperatures of the order of 150° C. to 250° C. or higher, as well as super atmospheric pressure.

Inasmuch as the polycarboxylated naphthalenes produced by the oxidation processes of the present invention have value as plasticizer and dye-stuff intermediates, it is apparent that the provision of a relatively inexpensive smooth operating process for the oxidation of bridged naphthalenes is a highly desirable result.

We have found that the 1,8 and 4,5 bridged naphthalenes, with which the present invention is particularly concerned, may be conveniently and efficiently catalytically oxidized at relatively low temperatures and pressures. In further detail, the aforementioned bridged naphthalenes may be oxidized to polycarboxylated naphthalene derivatives by passing air or other sources of oxidizing medium into a solution or suspension of the bridged naphthalene contained in an aldehyde activated catalyst under good agitation. In general, in our process relatively low temperatures within the range of 50° C. to not higher than 120° C. may be used and preferably temperatures between 50° and 95° is advantageous for reasons discussed hereinafter.

The catalyst solution may be contained in any reactor equipment in which good agitation may be provided. As set forth in the several examples which follow, the conventional apparatus known as a turbomixer may be used. Also, a vertically extending column equipped with temperature-controlling coils and provided with suitable inlets for air and for the compound to be oxidized is satisfactory apparatus. In such apparatus a diffusion disk at the bottom of the column is provided for breaking up the gas flow and to get agitation. Into either apparatus we introduce sufficient butyric acid to fill the unit ½ to ⅔ full and dissolve or suspend in this butyric acid a suitable source of cobalt ions as a catalyst, such as cobalt butyrate or acetate. However, it is to be noted that other sources of cobalt such as the oxide, hydroxide or the like may be used. Sufficient source of the cobalt material is included to give a 2% or 3% solution. However, an amount of cobalt up to saturation in the liquid may be used, but is not required. This solution is activated by passing a stream of butyraldehyde therethrough, accompanied by slight warming of the butyric acid solution up to, for example, 60° to 90° C. The activation of the solution is indicated by color change thereof and the fact that the butyraldehyde is substantially completely converted to butyric acid.

It is to be noted we have found that the combination of a butyric acid solution containing cobalt activated with butyraldehyde is a particularly excellent combination for use in connection with the oxidation of bridged naphthalenes in accordance with the present invention. However, certain other aldehydes, such as propionaldehyde and the like aliphatic aldehydes may be used for activating the cobalt catalyst, but the foregoing is, as indicated, preferred. The bridged naphthalene compound to be oxidized may be incorporated in the catalyst solution at the start and oxygen or air passed into the solution to carry out the oxidation. However, in accordance with our generally preferred operation as will be apparent from the specific examples which follow, it is possible to introduce substantially continuously and simultaneously both air and butyraldehyde. Also, the bridged naphthalene may be introduced in several lots. As already indicated, we have found that the process operates very well and completely under normal atmospheric pressures. Therefore, there is no need to employ super atmospheric pressure or spherical high pressure apparatus. As a matter of fact, as will be observed from the specific examples which follow, relatively satisfactory conversion is secured even at the low temperature and pressure conditions we have described. This is advantageous not only in that the expense of compressors and the like are eliminated, but apparently product decomposition, corrosion difficulties and the like are minimized which otherwise might be occasioned if high pressures and temperatures were involved.

In many instances the polycarboxylated naphthalenes produced by the oxidation of bridged naphthalenes in accordance with the present invention separate from solution and are easily isolated by simple filtration. Therefore, if it is desired to operate continuously the reactor may be substantially continuously supplied with the air, bridged naphthalene, butyraldehyde, sufficient butyraldehyde being supplied to furnish some content of butyric acid catalyst liquid upon its oxidation. Also substantially continuously removed from the reactor is a portion of the liquid contents thereof which upon cooling causes the polycarboxylated naphthalene derivative to separate. The separated product is filtered or centrifuged from the liquid and the liquid recycled to the process for maintaining the catalyst level.

The foregoing supplies a general understanding of the process of the present invention. Turning now to a more detailed understanding of the bridged naphthalenes which may be processed, we have found that by the use of the appropriate conditions described herein that naphthalene derivatives of the type:

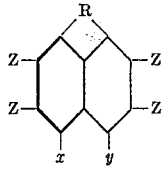

where R is a divalent residue chosen from the group

—CH₂CH₂—, COCH₂CO—, —CH₂COCH₂—
—COCH₂C=NH—, —COCH₂CH₂CO—
—COCO—, —CH=CH—, —COCH—CH—
—CH₂CH₂CH₂— or simple substituted derivatives thereof; $x$ and $y$ are —H, CH₃, —COOH, —CO alkyl, etc., or together may be the same as R; and Z is —H, or halogen, may be oxidized by air or oxygen in the presence of an aldehyde-activated cobalt catalyst at the relatively low temperature of 50° to 120° C. to polycarboxylated naphthalenes, or the corresponding anhydrides.

In specific illustration of the above types of starting materials we may write:

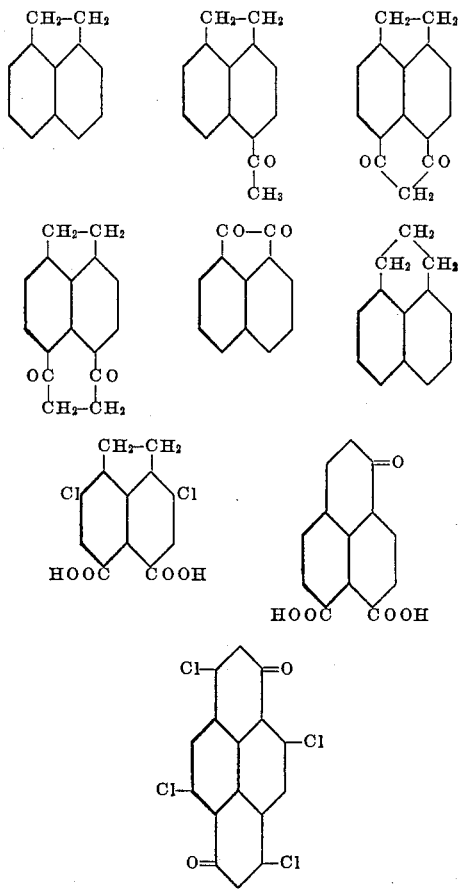

A still further understanding of the invention will be had from a consideration of the examples which follow, it being understood that these examples are set forth primarily for purposes of illustration and not for unduly limiting the present invention.

*Example I*

The apparatus and procedure used in this example are of general applicability to the other examples and therefore a detailed description of the process is given principally in this example.

Into a turbomixer is charged 108 parts of cobalt acetate and 1500 parts of butyric acid. At 80° C. a slow stream of oxygen is introduced and approximately 50 parts of butyraldehyde added dropwise until the solution takes on the typical green color of an active cobalt catalyst. Acenaphthene, 110 parts, is then introduced slowly in 5 part lots, oxygen being continuously introduced and butyraldehyde being added to maintain the activity of the catalyst. The total amount of butyraldehyde in this example is about 375 parts. The operation consumes about 7 hours at a temperature of 80 to 95° C. The mix is cooled and filtered. The moist yield is boiled with 3000 parts of 3% NaOH and filtered hot. Only a trace of grey slime is collected on the filter. The filtrate is acidified and the finely divided precipitate filtered off, washed with hot water and dried at 140° C. The yield is 98 parts of a tan material soluble in concentrated sulfuric acid to a yellowish brown solution having a blue fluorescence. The material melts at 268–70° C. (A mixed melting point with commercial naphthalic anhydride (m. 258–61° C.) was 263–6° C.) Therefore, in this example a substantial yield of naphthalic anhydride was obtained.

*Example II*

In this example the apparatus and procedure used was generally similar to that already described in detail under Example I. Again, the compound treated was acenaphthene. The catalyst solution comprised approximately 100 parts of cobalt acetate dissolved in acetic acid and activated with acetaldehyde. A substantial portion of the oxidation product from this example was isolated and found to be naphthalic anhydride.

*Example III*

In accordance with this example, the apparatus and other items of operation were substantially identical with that set forth under Example I. However, in this example, perisuccinoylacenaphthene was the compound oxidized. This starting compound was prepared according to J. Am. Chem. Soc., 54, 4353. The results of this example showed that 73% of a light yellow acid subliming above 300° C. was obtained. This acid was tested by condensation of the body with 2 moles of o-phenylene diamine to give a dye stuff which dyed cotton a brilliant orange-red from an olive green vat. Therefore, the product of oxidation by this example is considered to be 1,4,5,8-tetracarboxynaphthalene or its bis anhydride.

*Example IV*

In accordance with this example pyrenic anhydride was oxidized by air in the presence of an aldehyde-activated cobalt catalyst as described in the preceding examples. The pyrenic anhydride was prepared according to Ann. 240, 167. The oxidation product from the reaction of this example was substantially identical with the product already described in Example III.

*Example V*

The oxidation of 2,4,7,10-tetrachloropyrene-3,8-quinone (prepared by the method of Ann. 531, 93) gave a product which after drying at 135° C. melted at 385–390° C. Treatment with ammonia at the boil gave a material having a blue-green vat. Hence the oxidation product appears to be 2,6-dichloro-1,4,5,8-tetracarboxyl naphthalene.

*Example VI*

In this example, acenaphthoquinone was processed in the apparatus set up described in connection with Example I. The oxidation was carried out for slightly over six hours, butyraldehyde being introduced into the reaction along with the air. The product of the oxidation isolated in good yields was identical with the product of Example I.

*Example VII*

In accordance with this example, periacenaphthindandione diketimide (prepared in accordance with German Patent 557,665) was the starting material introduced into the acid solution of cobalt which had been activated with aldehyde. The introduction of aldehyde as well as the air for oxidation was continued during the process. The temperature was held within the range of 70 to 95° C. At the conclusion of the oxidation, product was isolated and treated as in Example III, indicating that a product identical with that described under Example III had been produced.

*Example VIII*

In accordance with this example, 8-ethyl-(7,8-dihydro-9-phenalone) prepared in accordance with Ber. 55, 1835 was the bridged naphthalene compound subjected to oxidation in accordance with the present invention. This compound was oxidized in the aldehyde-activated catalyst solution as described in the previous examples. The temperature was maintained below 100° C. and air and aldehyde supplied to the reactor substantially continuously. Approximately a 90% yield of a material identical with that described under Example I was obtained.

*Example IX*

In accordance with this example, oxidation of 5-acetylacenaphthene in the presence of an aldehyde-activated catalyst at between 50° C.–95° C. gave a product which was extracted with hot chloroform. The chloroform upon cooling deposited crystals which after drying at 130° C. and a further recrystallization melted at 189–90° C. thereby indicating the production 4-acetyl-1,8-naphthalic anhydride in good yields.

The residue from the chloroform extraction after redissolving in NaOH solution and acidification was dried at 130° C. The product melted at 241–2° C. and appears to be 4-carboxy-1,8-naphthalic anhydride.

As may be observed by consideration of the above examples, various bridged naphthalene compounds may be conveniently and effectively oxidized to polycarboxylated naphthalene derivatives at relatively low pressure and temperature conditions. No particular corrosion difficulties or the like were experienced with the apparatus under the pressure and temperature conditions employed. Air is the most convenient oxidizing gas, but oxygen alone or mixed with other components may be used.

The products producible by our invention may be used in various ways as plasticizers and dye stuff intermediates. For example, 1,8-dicarboxynaphthalene producible by our invention is a very useful dye intermediate in a series of vat colors containing a perylene nucleus. Some of these are Caledon Red 2G and Caledon Claret R. Some very brilliant vat colors, Indanthrene Scarlet 2G and Indanthrene Brilliant Orange GR, are derived from 1,4,5,8-tetracarboxy naphthalene.

We claim:

1. A process for the oxidation of bridged naphthalene compounds to polycarboxylated naphthalene derivatives, which comprises charging a reaction unit with a catalyst solution essentially comprised of a lower aliphatic acid containing cobalt ions therein, said catalyst having been activated by contacting a lower aliphatic aldehyde therewith, supplying the bridged naphthalene compound to be oxidized to the reaction unit and into contact with the catalyst, also substantially simultaneously and continuously supplying an oxygen-containing gas into contact with the bridged naphthalene compound and the catalyst solution and also supplying a lower aliphatic aldehyde to the oxidation, maintaining the temperature of the reaction between 50° C.–120° C. whereby the bridged naphthalene compound is to a substantial extent oxidized to a polycarboxylated naphthalene derivative.

2. A relatively low temperature, low pressure process for oxidizing bridged naphthalene compounds to polycarboxylated naphthalene derivatives which comprises contacting air with the bridged naphthalene compound to be oxidized, and in the presence of a cobalt catalyst carried in butyric acid, said catalyst having been activated with butyraldehyde, the process being carried out between a temperature of 50° C.–120° C., and under normal atmospheric pressure, together with the supplying of butyraldehyde to the process at least a substantial part of the time that the bridged naphthalene compound is being supplied to the process.

3. A relatively low temperature, low pressure process for oxidizing acenaphthene which comprises contacting an oxygen-containing gas with the acenaphthene in the presence of cobalt catalyst contained in butyric acid, said catalyst having been activated with butyraldehyde, the process being carried out at a temperature between 50 and 95° C. and under normal atmospheric pressure.

4. A process for the oxidation of naphthalene compounds which comprises charging a turbomixer with a catalyst solution essentially comprised of a lower aliphatic acid containing cobalt ions therein, said catalyst having been activated by contacting a lower aliphatic aldehyde therewith until a color change has taken place and the aldehyde is substantially completely oxidized to acid, supplying a naphthalene compound from the group consisting of acenaphthene, perisuccinoylacenaphthene, pyrenic anhydride, 2,5,7,10-tetrachloropyrene-3,8-quinone, acenaphthoquinone, periacenaphthindandione diketimide, 8-ethyl-(7,8-dihydro-9-phenalone), and 5-acetylacenaphthene; also substantially simultaneously and continuously supplying an oxygen-containing gas to the turbomixer into contact with the naphthalene compound, subjecting the components to substantial agitation, from time to time supplying lower aliphatic aldehyde to the oxidation, maintaining the temperature of the reaction between 70 and 95° C. whereby the naphthalene compound is, to a substantial extent, oxidized to a polycarboxylated naphthalene derivative.

5. A process for the oxidation of acenaphthene which comprises charging a turbomixer with a catalyst solution essentially comprised of a lower aliphatic acid containing cobalt ions therein, said catalyst having been activated by contacting a lower aliphatic aldehyde therewith until a color change has taken place and the aldehyde is substantially completely oxidized to acid, incorporating acenaphthene into the catalyst solution, also substantially simultaneously and continuously supplying an oxidizing gas to the turbomixer into contact with the naphthalene compound, subjecting the components to agitation, from time to time supplying lower aliphatic aldehyde, maintaining the temperature of the reaction between 50 and 95° C. whereby the naphthalene compound is, to a substantial extent, oxidized to a polycarboxylated naphthalene derivative.

6. A process for the oxidation of perisuccinoylacenaphthene which comprises charging a turbomixer with a catalyst solution essentially comprised of a lower aliphatic acid containing cobalt ions therein, said catalyst having been activated by contacting a lower aliphatic aldehyde therewith until a color change has taken place and the aldehyde is substantially completely oxidized to acid, incorporating perisuccinoylacenaphthene into the catalyst solution, also substantially simultaneously and continuously supplying an oxidizing gas to the turbomixer into contact with the naphthalene compound, subjecting the components to agitation, from time to time supplying lower aliphatic aldehyde, maintaining the temperature of the reaction between 50 and 95° C. whereby the naphthalene compound is, to a substantial extent, oxidized to a polycarboxylated naphthalene derivative.

7. A process for the oxidation of pyrenic anhydride which comprises charging a turbomixer with a catalyst solution essentially comprised of a lower aliphatic acid containing cobalt ions therein, said catalyst having been activated by contacting a lower aliphatic aldehyde therewith until a color change has taken place and the aldehyde is substantially completely oxidized to acid, incorporating pyrenic anhydride into the catalyst solution, also substantially simultaneously and continuously supplying an oxidizing gas to the turbomixer into contact with the naphthalene compound, subjecting the components to agitation, from time to time supplying lower aliphatic aldehyde, maintaining the temperature of the reaction between 50 and 95° C. whereby the naphthalene compound is, to a substantial extent, oxidized to a polycarboxylated naphthalene derivative.

8. A process for the oxidation of 2,5,7,10-tetrachloropyrene-3,8-quinone which comprises charging a turbomixer with a catalyst solution essentially comprised of a lower aliphatic acid containing cobalt ions therein, said catalyst having been activated by contacting a lower aliphatic aldehyde therewith until a color change has taken place and the aldehyde is substantially completely oxidized to acid, incorporating 2,5,7,10-tetrachloropyrene-3,8-quinone into the catalyst solution, also substantially simultaneously and continuously supplying an oxidizing gas to the turbomixer into contact with the naphthalene compound, subjecting the components to agitation, from time to time supplying lower aliphatic aldehyde, maintaining the temperature of the reaction between 50 and 95° C. whereby the naphthalene compound is, to a substantial extent, oxidized to a polycarboxylated naphthalene derivative.

9. A process for the oxidation of acenaphthoquinone which comprises charging a turbomixer with a catalyst solution essentially comprised of a lower aliphatic acid containing cobalt ions therein, said catalyst having been activated by contacting a lower aliphatic aldehyde therewith until a color change has taken place and the aldehyde is substantially completely oxidized to acid, incorporating acenaphthoquinone into the catalyst solution, also substantially simultaneously and continuously supplying an oxidizing gas to the turbomixer into contact with the naphthalene compound, subjecting the components to agitation from time to time supplying lower aliphatic aldehyde, maintaining the temperature of the reaction between 50 and 95° C. whereby the naphthalene compound is, to a substantial extent, oxidized to a polycarboxylated naphthalene derivative.

JAMES M. STRALEY.
CLYDE W. WAYMAN.

REFERENCES CITED

The following references are of record in the file of this patent:

UNITED STATES PATENTS

| Number | Name | Date |
|---|---|---|
| 1,439,500 | Bailey et al. | Dec. 19, 1922 |
| 2,005,183 | Flemming et al. | June 18, 1935 |
| 2,127,096 | Vollman et al. | Aug. 16, 1938 |
| 2,223,493 | Loder | Dec. 3, 1940 |
| 2,245,528 | Loder | June 10, 1941 |

OTHER REFERENCES

Paillard et al.: Chem. Abstracts, vol. 27, p. 4533 (1933).